July 17, 1928.
H. BANY ET AL
1,677,702
CONTROL OF ELECTRIC CIRCUITS
Filed Aug. 12, 1927
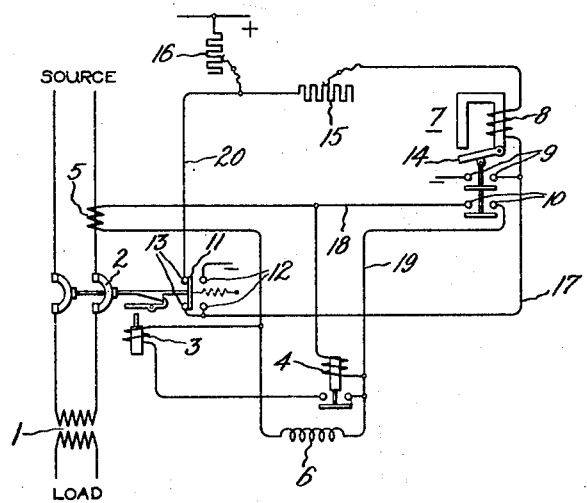
Inventors:
Herman Bany,
Daniel C. Hoffmann,
by *Alexander F. Lenz.*
Their Attorney.

Patented July 17, 1928.

1,677,702

UNITED STATES PATENT OFFICE.

HERMAN BANY, OF SCOTIA, AND DANIEL C. HOFFMANN, OF SCHENECTADY, NEW YORK, ASSIGNORS TO GENERAL ELECTRIC COMPANY, A CORPORATION OF NEW YORK.

CONTROL OF ELECTRIC CIRCUITS.

Application filed August 12, 1927. Serial No. 212,586.

Our invention relates to improvements in the control of electric circuits, and more particularly to improvements in the control of circuit breakers in protective arrangements whereby the protective apparatus is rendered temporarily inoperative on transient conditions such as occur on closing the circuit of a transformer, motor, etc.

Our invention will be better understood from the following description when considered in connection with the accompanying drawing and its scope will be pointed out in the appended claims.

The single figure of the accompanying drawing illustrates diagrammatically an embodiment of our invention as applied to the control and protection of an electric circuit comprising a power transformer 1 which is arranged to be connected to the source by suitable circuit interrupting means such as a circuit breaker 2. This is shown as of the latched closed type and is provided with a trip coil 3 and so far as our invention is concerned may be either power or manually operated for closing. For effecting the opening of the circuit breaker 2 on the occurrence of abnormal circuit conditions, there is provided means such as an over-current relay 4 which is suitably connected to be energized in accordance with the circuit current as by means of a current transformer 5. When the load on the power transformer 1 comprises a rectifier equipment of the mercury arc type, the relay 4 is preferably substantially instantaneous in operation so that on the occurrence of an arc-back in the rectifier tube, which is in effect a short circuit on the transformer secondary, a quick release of the circuit is insured. The trip coil 3 of the circuit breaker 2 may also be arranged to be energized directly from the circuit. For this purpose suitable means such as a reactor 6 may be connected in series with the winding of the relay 4 across the secondary of the current transformer 5. This reactor 6 is arranged to saturate substantially at normal load current and the trip coil 3 is arranged to be connected across the reactor on the occurrence of current in excess of a predetermined value through the contacts of the relay 4 so as to effect the opening of the circuit breaker 2.

In order to prevent the opening of the circuit breaker 2 following its closing and the consequent magnetizing current inrush which although of a transient nature is generally sufficient to cause the operation of the relay 4 unless it is set to operate with time delays so long or at current values so high as to jeopardize protection, we provide means for rendering the relay 4 temporarily inoperative on the closing of the circuit breaker. As shown this means comprises an electromagnetic device 7 arranged to have its winding 8 energized on the closing of the circuit breaker 2 and on energization of the winding to maintain the circuit thereof and to short-circuit the winding of the relay 4. For this purpose the device 7 is provided with a plurality of contacts 9, 10 arranged respectively in the circuit of the winding 8 and in a circuit across the winding of the relay 4. The winding 8 is arranged to be energized from a direct current source, the positive and negative busses of which are indicated by the corresponding signs. For connecting the winding 8 to the direct current source on the opening of the circuit breaker 2, means such as an auxiliary switch 11 associated with the circuit breaker is arranged to control contacts 12 in series with the winding.

In order to have a time interval between the closing of the circuit breaker 2 and the restoration of the over-current relay 4 to the operative condition, we provide means, which may be associated with the circuit breaker, such as contacts 13 arranged to be closed by the auxiliary switch 11 when the circuit breaker is closed. The contacts 13 are so arranged that when closed they short-circuit the winding 8. In this way the decay of the flux in the closed magnetic circuit of the electromagnetic device 7 is retarded and the release of the armature 14 and the opening of the contacts 9, 10 controlled by the movement thereof delayed. For purposes of adjustment and also to limit the current when the winding 8 is short-circuited, suitable means such as variable resistors 15, 16 are provided.

Considering the parts positioned as shown in the accompanying drawing, it will be assumed that an over-current condition sufficient to operate the relay 4 and thereby to trip the circuit breaker 2 occurs. In this case the relay 4 closes its contacts, thereby connecting the trip coil 3 across the reactor 6 and energizing the trip coil to release the circuit breaker. In opening, the auxiliary switch 11 closes contacts 12 thereby completing the circuit of the winding 8 as follows: positive side of D. C. source, resistors 16 and 15, winding 8, conductor 17, contacts 12 and negative side of D. C. source. This energizes the electromagnetic device 7 which picks up its armature 14 and thereby closes the contacts 9 and 10. The closing of the contacts 9 seals in the circuit of the winding 8 as will be obvious from the drawing. The closing of the contacts 10 completes a short circuit across the winding of the relay 4. This short circuit includes the conductors 18, 19. When the circuit breaker 2 is closed the opening of contacts 12 does not deenergize the winding 8 since its circuit is maintained through contacts 9. When, however, the circuit breaker 2 and therefore the contacts 13 are closed a short circuit is completed across the winding 8 and the resistor 15 as follows: conductor 20, contacts 13 and conductor 17. This is in effect a short circuit on the D. C. source but the current is limited by the resistor 16. The winding 8 being short-circuited opposes the decay of flux in the magnetic circuit of the device 7 and the dropout of the armature 14 is delayed. After a time dependent on the decay of the flux, the contacts 9 and 10 open and the short circuit across the relay 4 is removed so that the normal protection is restored.

What we claim as new and desire to secure by Letters Patent of the United States, is:—

1. In combination with an electric circuit, a circuit breaker therefor, and means including a relay for effecting the opening of the circuit breaker on the occurrence of abnormal circuit conditions, means for rendering said relay temporarily inoperative on the closing of the circuit breaker comprising an electromagnet having a winding arranged to be energized on the opening of the circuit breaker and normally open contacts in the circuit of the winding and in a circuit across the winding of the relay arranged to be closed on the energization of the electromagnet winding, and means arranged on the closing of the circuit breaker to short circuit the electromagnet winding whereby to effect a time delay in the opening of said contacts.

2. In combination with an electric circuit, a circuit breaker therefor, and means including an over-current relay for effecting the opening of the circuit breaker on the occurrence of current above a predetermined value, means for preventing said relay from effecting the opening of said circuit breaker on the occurrence of a transient over-current condition following the closing of the circuit breaker comprising an electromagnetic device arranged to have its winding energized on the opening of the circuit breaker and on energization of the winding to maintain the circuit thereof and to short circuit the winding of the relay, and means associated with the circuit breaker arranged on the closing thereof to short circuit the winding of the electromagnetic device whereby to effect a time delay in the deenergization of the electromagnetic device and the removal of the short circuit from the relay winding.

3. In combination with an electric circuit, a circuit breaker therefor, and means including a relay for effecting the opening of the circuit breaker on the occurrence of abnormal circuit conditions, means for rendering said relay temporarily inoperative on the closing of the circuit breaker comprising an electromagnetic device arranged to have its winding energized on the opening of the circuit breaker and on energization of the winding to maintain the circuit thereof and to short circuit the winding of the relay, and means arranged on the closing of the circuit breaker to short circuit the winding of the electromagnetic device whereby to effect a time delay in the deenergization thereof.

4. In combination with an electric circuit, a circuit breaker therefor, and means including a substantially instantaneous over-current relay for effecting the opening of the circuit breaker on the occurrence of current above a predetermined value, means for preventing the relay from effecting the opening of the circuit breaker on the occurrence of a transient over-current condition following the closing of the circuit breaker comprising an electromagnet having a winding arranged to be energized on the opening of the circuit breaker and normally open contacts in a circuit across the winding of the relay arranged to be closed on energization of the electromagnet winding, and means arranged on the closing of the circuit breaker to short circuit the electromagnet winding whereby to effect a time delay in the opening of said contacts.

5. In combination with an electric circuit, a circuit breaker therefor, and means including a relay for effecting the opening of the circuit breaker on the occurrence of abnormal circuit conditions, means for rendering said relay temporarily inoperative on the closing of the circuit breaker comprising an electromagnetic device arranged to have its winding energized on the opening of the circuit breaker, and means arranged on the closing of the circuit breaker to short circuit the winding of the electromagnetic device whereby to effect a time delay in the deenergization thereof.

6. In combination with a power transformer and means for controlling the circuit thereof including a circuit breaker and a substantially instantaneous over-current relay for effecting the opening of the circuit breaker on the occurrence of current above a predetermined value, means for preventing said relay from effecting the opening of said circuit breaker on the magnetizing inrush current of the transformer at the closing of the circuit breaker comprising an electromagnet having a winding arranged to be energized on the opening of the circuit breaker, and normally open contacts in a circuit across the winding of the relay arranged to be closed on energization of the electromagnet winding, and means associated with the circuit breaker and arranged on the closing thereof to short circuit the electromagnet winding whereby to effect a time delay in the opening of said contacts.

In witness whereof, we have hereunto set our hands this 11th day of August, 1927.

HERMAN BANY.
DANIEL C. HOFFMANN.